Patented Nov. 1, 1938

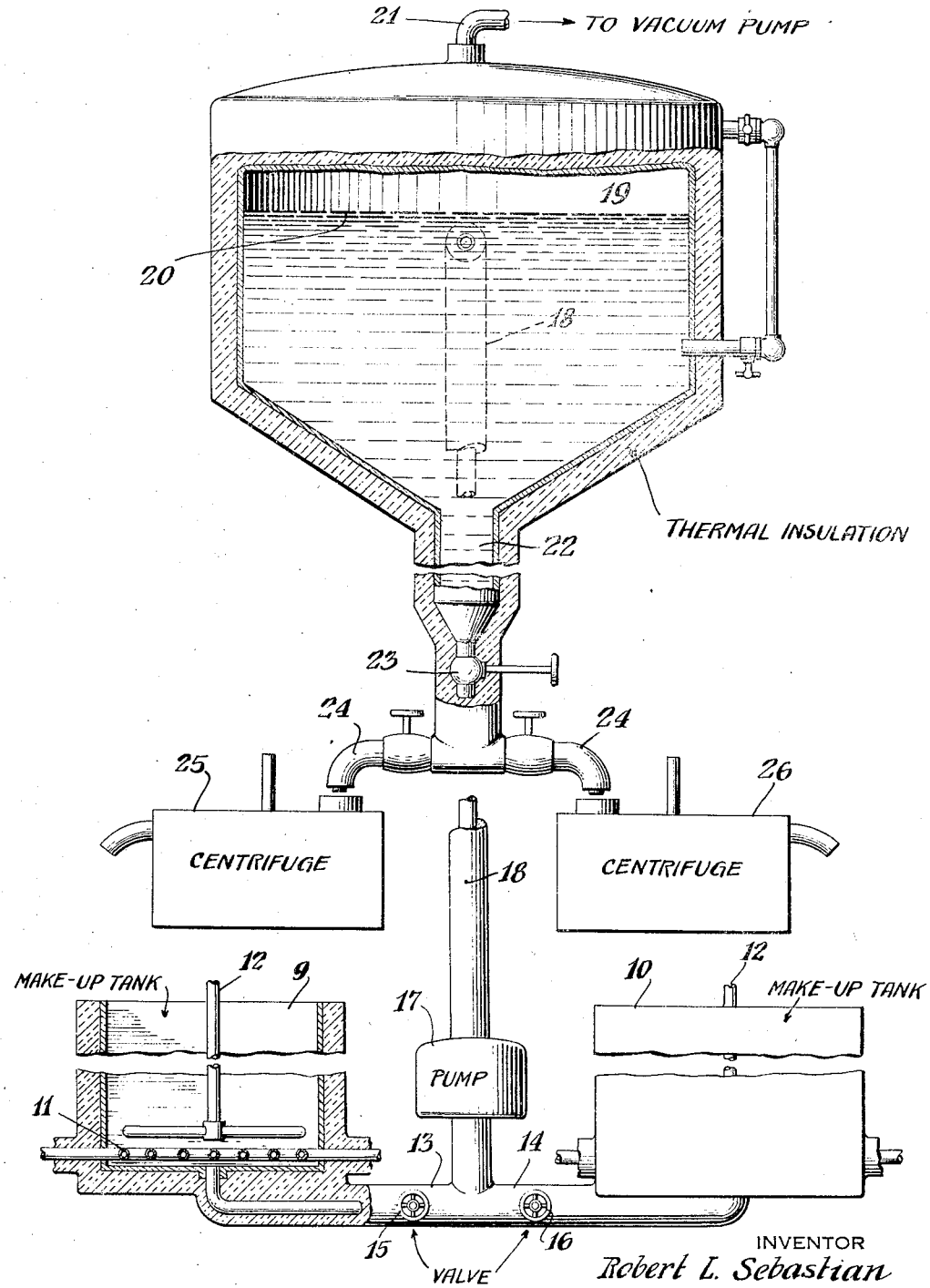

2,135,475

UNITED STATES PATENT OFFICE 2,135,475

MAKING CRYSTALLINE MONOCALCIUM PHOSPHATE

Robert Louis Sebastian, Rocky Hill, N. J., assignor to The American Agricultural Chemical Company, Newark, N. J., a corporation of Delaware Application July 25, 1936, Serial No. 92,522

4 Claims. (Cl. 23—109)

This invention relates to obtaining monocalcium phosphate in crystalline form from a solution of the salt in phosphoric acid, and more particularly it relates to control of the size of the crystals so produced. The salt solution may be produced in any convenient manner, but I prefer to make it by reaction of phosphoric acid and a calcium compound, say the oxide, hydroxide, carbonate, or a more basic phosphate. The chief object of the invention is to provide an efficient and rapid process in which the salt is precipitated in crystal form from a hot solution. Another object is to provide a process in which the crystals after they are initially formed are grown to a desired size by passing them through a zone of increasing acid concentration, after which they are separated from the mother liquor. A further object is to provide a continuous process for the purpose, in which a large proportion of the dissolved salt is recovered. To these and other ends the invention comprises the novel features and combinations hereinafter described.

In practicing my invention in the preferred manner I mix the calcium compound, water, and an excess of phosphoric acid of suitable strength, to give a clear (unsaturated) solution of monocalcium phosphate. The solution is transferred to an evaporator, where water is evaporated under reduced pressure, thereby increasing the concentration of the excess acid. At a certain concentration, depending upon the temperature, pure monocalcium phosphate crystallizes out. The evaporator has a tapering or inclined bottom, opening into a narrow leg, so that as the crystals sink they descend into the leg and thus pass through an extended zone or column of downwardly increasing acid concentration, thereby causing the crystals to grow by reason of the decreasing power of the liquor to hold monocalcium phosphate in solution. By preference the leg is narrow enough to confine all or practically all of the ebullition, if any, to the zone above the leg. When the crystals have grown to the desired size they are discharged through a valve at the bottom into a centrifuge or filter, where they are separated from the mother liquor. The crystals so obtained carry free phosphoric acid which may be removed in any convenient way, as by washing with a volatile non-aqueous solvent or by tumbling with lime. The liquid effluent from the centrifuge or filter, with the addition of acid and water, is used to produce a further quantity of monocalcium phosphate solution for delivery to the evaporator. Preferably the evaporation of the solution, the growth of the crystals, and the separation of the crystals from the liquor, are all effected at about the same temperature, or within a relatively narrow temperature range. For this purpose it is preferred to provide the evaporator and separator with adequate heat insulation and deliver the monocalcium phosphate solution to the evaporator at the desired temperature, depending then upon the thermal insulation of the apparatus to keep the temperature gradient therein substantially constant.

In the annexed drawing I have illustrated diagrammatically, partly in vertical section, a convenient and efficient type of apparatus for practicing my process.

Referring to the drawing, 9, 10 are make-up tanks in which the solution of monocalcium phosphate is produced by the reaction of a calcium compound and phosphoric acid. These tanks or vessels are used alternately and may be provided with suitable covers, not shown, and may also have coils, as 11, for circulation of a heating or cooling medium, for instance steam or water, to bring the temperature of the solution up or down to a desired value. It will be understood that the reaction is exothermic. The tanks are equipped with agitators 12, and are connected by pipes 13, 14, having valves 15, 16, to a pump 17 by which solution from the tanks in alternation may be delivered by pipe 18 to the evaporator 19, preferably discharging at a point below the surface of the liquor therein, indicated by the line 20. The evaporator 19 comprises an enlarged upper vessel connected by pipe 21 to a vacuum pump or suction fan, not shown. The bottom of the upper vessel tapers downwardly into connection with a pipe or tubular leg 22, the lower end of which tapers to an outlet valve 23 connected to valved branch pipes 24, 24, by which the effluent liquor and crystals can be delivered to the centrifuges 25, 26 alternately. The length of the leg is greater than barometric, that is, it is of such length that the hydrostatic head above the discharge orifices of the outlet pipes 24 will be sufficiently greater than the difference between atmospheric pressure and the lowest pressure to be used on the liquid surface 20, to permit discharge of liquor and crystals from the leg at the desired rate. A large evaporating surface in the chamber 19 is desirable, in order to keep ebullition close to the surface and minimize convection currents. Making the leg 22 long and narrow is also advantageous, as it facilitates the desired downward increase of acid concentration of the liquor and consequent decrease of solvent power of the liquor for the monocalcium phosphate.

In practicing the process in the preferred manner I mix, in each of the make-up tanks, water 87.5 parts, phosphoric acid 112.5 parts, and lime (CaO) 11 parts, by weight, a total of 211 parts. The acid may be conveniently used in the form of 150 parts of a 75 per cent solution, with the further addition of 50 parts of water. Considerable heat is evolved by the reaction but further heat can be supplied if necessary by means of the coils 11 to bring the temperature up to about 85° C. The reaction gives approximately 50.4 parts of monocalcium phosphate, all or substantially all of which, at the temperature stated, is in solution in the liquor, the acid concentration of the liquor being about 45.5 per cent $H_3PO_4$, and the monocalcium phosphate content of the liquor being about 23.9 per cent.

Phosphate solution is now pumped from one make-up tank to the evaporator, bringing the surface of the liquor therein up to the desired point above the orifice of pipe 18, and the vacuum pump or suction fan is started. At the desired reduced pressure thus obtained, water is evaporated (decreasing the temperature to not more than about 65° C.), and liquor from one of the make-up tanks or reaction vessels is delivered at a rate which will compensate for the water removed by evaporation and so keep the liquid surface in the evaporator at substantially the same point. As the operation continues, the acid concentration of the liquor in the evaporator increases, and, reaching a point at which (at the temperature of the liquor) some of the dissolved salt must separate out, crystals of monocalcium phosphate form and settle down into the leg 22 where, as the acid concentration of the liquor increases, they continue to grow, finally reaching the desired size, whereupon the valve 23 is opened to deliver the slurry of mother liquor and crystals to one of the centrifuges. The latter, when sufficiently filled, is set to work to separate the crystals from the liquor. In order to maintain the liquid surface in the evaporator at the desired height the rate of delivery of solution to the evaporator is increased, or the pressure on the liquor is increased by reducing the suction rate, or both. When the first centrifuge is filled the outflow is diverted to the other centrifuge by manipulation of the valves in the branch pipes, the centrifuges being thus used in alteration to keep pace with the effluent slurry.

With the discharge from the crystal growing leg or zone 22 continuous, the size of the crystals delivered to the centrifuge depends, in general, upon the temperature of the liquor, its acid concentration, and the period of time during which growth is permitted. Some growth may occur in the evaporating vessel above the leg 22 (and some crystals are formed in the leg), but the major portion of the growth takes place in the leg, due to its length; and the period of growth is the time required for the crystals to reach the outlet. It will be seen that by adjustment of the outlet valve or valves the rate of discharge of the slurry or mixture of crystals and liquor can be varied, thereby decreasing or increasing the crystal growing time. In either case the rate of delivery of solution to the evaporator and the rate of evaporation are adjusted to maintain a suitable depth of liquid in the evaporating chamber, the solution delivery rate being adjusted by varying the speed of the pump or by adjustment of the valves 13 and 14, or both, and the evaporation rate by varying the pressure (or vacuum) above the liquor or by varying the temperature of the solution, or both. In practice, especially when producing crystals from a make-up composition of about the proportions stated above, that is, acid 150 parts (75 per cent concentration), water 50, and lime 11, I prefer to keep the inlet temperature constant at about 85° C. and the outlet temperature not less than about 65° C., and control the crystal size by adjustment of one or more of the other factors involved, say the rate of evaporation and the rate of solution supply to the evaporator. With the specific mix given, supplying the solution to the evaporator at 85° C., evaporating 10 parts of water, and decreasing the temperature to 65° C. at the outlet, 88 per cent of the monocalcium phosphate produced is recovered, the rest remaining in solution and going back to the evaporator when the liquor from the centrifuge or filter, with the addition of acid and water, is used to produce a further quantity of monocalcium phosphate solution.

It is to be understood that the invention is not limited to the specific procedure and apparatus described in the foregoing specification, but can be practiced in other ways without departure from its spirit as defined by the appended claims.

I claim—

1. Process of producing monocalcium phosphate in crystalline form, comprising mixing lime, water, and phosphoric acid in approximately the proportions, by weight, of lime 11 parts, acid 112.5 parts, and water 87.5 parts, and forming a solution of monocalcium phosphate in hot phosphoric acid of about 45 per cent strength; passing the solution to an evaporating zone at a temperature of about 85° C. and evaporating water from the solution under reduced pressure while preventing fall of the temperature below about 65° C. to increase the acid concentration of the solution and precipitate monocalcium phosphate in crystalline form; passing the solution and crystals through a zone of increasing acid concentration at a temperature within said range whereby the crystals are caused to grow; withdrawing the solution and grown crystals from said zone, and separating the crystals from the solution.

2. In the art of producing crystalline monocalcium phosphate from a solution thereof in hot phosphoric acid, in which crystallization is caused by decreasing the solvent power of the acid by evaporation and cooling, after which the crystals are passed through a zone wherein they are grown to a desired size: the improvement which comprises delivering the solution at a temperature of about 85° C. to a crystallizing zone, and solely by evaporation therein and such fall of temperature as results from the evaporation decreasing the solvent power of the acid whereby small crystals are formed, the fall of temperature being to a value not less than about 65° C.; forthwith passing the solution and the crystals so formed into a crystal-growing zone wherein the temperature is maintained substantially unchanged and the growth of the crystals increases the acid concentration of the solution thereby causing further growth with further increase of acid concentration and further growth, until the crystals have attained the desired size; and withdrawing the crystals and acid from the growing zone for recovery of the former.

3. In the art of producing crystalline monocalcium phosphate from a solution thereof in hot phosphoric acid, in which crystallization is caused by decreasing the solvent power of the acid by evaporation and cooling, after which the crystals are passed through a zone wherein they are grown to a desired size: the improvement which comprises delivering to a crystallizing zone a solution of monocalcium phosphate in phosphoric acid of about 45 per cent concentration with a monocalcium phosphate content of about 24 per cent the temperature of the solution being about 85° C., and solely by evaporation therein and such fall of temperature as results from the evaporation decreasing the solvent power of the acid whereby small crystals are formed, the evaporation being at such rate as to prevent fall of temperature to below about 65° C.; forthwith passing the solution and the crystals so formed into a crystal-growing zone wherein the temperature is maintained substantially unchanged and the growth of the crystals increases the acid concentration of the solution thereby causing further growth with further increase of acid concentration and further growth, until the crystals have attained the desired size; and withdrawing the crystals and acid from the growing zone for recovery of the former.

4. The process set forth in claim 3, with the additional step of replenishing the evaporating zone by delivering thereto fresh solution at substantially the same temperature and of the same acid concentration and monocalcium phosphate content, whereby the crystal-forming conditions in said zone are maintained substantially constant.

ROBERT LOUIS SEBASTIAN.